United States Patent
Huie et al.

(10) Patent No.: US 12,197,802 B2
(45) Date of Patent: Jan. 14, 2025

(54) USER INTERFACE SYSTEM FOR DISPLAY-LESS INPUT DEVICES

(71) Applicant: Synaptics Incorporated, San Jose, CA (US)

(72) Inventors: Mark A. Huie, Sunnyvale, CA (US); Torbjorn Hovden, Santa Clara, CA (US); Andrew Chen Chou Hsu, San Carlos, CA (US); Kipling B. Inscore, San Jose, CA (US); Jerry Shao, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 819 days.

(21) Appl. No.: 16/455,610

(22) Filed: Jun. 27, 2019

(65) Prior Publication Data

US 2020/0409643 A1    Dec. 31, 2020

(51) Int. Cl.
| | |
|---|---|
| G06F 3/14 | (2006.01) |
| G06F 9/451 | (2018.01) |
| G06F 21/32 | (2013.01) |
| G06V 40/50 | (2022.01) |
| G06V 40/60 | (2022.01) |
| G08B 7/06 | (2006.01) |

(52) U.S. Cl.
CPC ............... G06F 3/14 (2013.01); G06F 9/451 (2018.02); G06F 21/32 (2013.01); G06V 40/50 (2022.01); G06V 40/67 (2022.01); G08B 7/06 (2013.01)

(58) Field of Classification Search
None
See application file for complete search history.

(56) References Cited

U.S. PATENT DOCUMENTS

| | | | | |
|---|---|---|---|---|
| 7,991,401 | B2 * | 8/2011 | Linder | H04M 1/72436 455/438 |
| 8,006,300 | B2 * | 8/2011 | Mizrah | H04L 9/3271 726/19 |
| 8,754,992 | B1 * | 6/2014 | Schulze | H04N 21/42226 725/132 |
| 8,935,777 | B2 * | 1/2015 | DeSoto | H04L 63/10 726/5 |
| 9,970,615 | B1 * | 5/2018 | Cardillo | F21S 43/10 |
| 2011/0302645 | A1 * | 12/2011 | Headley | H04L 9/3215 726/7 |
| 2014/0056172 | A1 * | 2/2014 | Lee | H04B 10/116 370/254 |

(Continued)

Primary Examiner — Christopher J Fibbi
(74) Attorney, Agent, or Firm — Paradice & Li LLP

(57) ABSTRACT

A system and method for providing an on-demand user interface for an input device. The system includes a first device and a second device. The first device is configured to receive a first user input and select a first notification from a plurality of notifications stored on the first device based at least in part on the first user input. The first device then outputs the first notification using one or more hardware resources. The second device detects the first notification output by the first device and matches the first notification to a first content item stored on the second device. The first content item includes instructions for providing a second user input on the first device. The second device then renders the first content item on a display. The first device further receives the second user input subsequent to the first user input.

19 Claims, 8 Drawing Sheets

(56) References Cited

U.S. PATENT DOCUMENTS

| | | | |
|---|---|---|---|
| 2014/0099107 A1* | 4/2014 | Ravich | H04B 10/116 |
| | | | 398/43 |
| 2016/0198342 A1* | 7/2016 | Kim | H04L 63/18 |
| | | | 455/411 |
| 2017/0078294 A1* | 3/2017 | Medvinsky | H04L 63/083 |
| 2021/0029112 A1* | 1/2021 | Palle | G06F 21/32 |

* cited by examiner

USER INTERFACE SYSTEM FOR DISPLAY-LESS INPUT DEVICES

TECHNICAL FIELD

The present embodiments relate generally to input devices, and specifically to a user interface system for display-less input devices.

BACKGROUND OF RELATED ART

Authentication is a mechanism for verifying the identity of a user (e.g., an individual or entity) attempting to access a device and/or application. A basic form of authentication may require a user to input a username and password via an input device. However, usernames and passwords are easily stolen and can be used by anyone (e.g., not just the authorized user) to gain access to a corresponding device or application. Thus, modern authentication schemes increasingly rely on biometric sensors (e.g., capable of identifying unique biological characteristics of the user) to provide greater levels of security. Example biometric sensors include: fingerprint scanners, facial recognition systems, eye scanners, voice recognition systems, and the like. Thus, biometric sensors may be configured to receive biometric inputs (e.g., user inputs containing one or more biometric signatures).

Before a biometric sensor can be used for authentication, the user must first enroll or register one or more biometric signatures (e.g., fingerprint, face, retina, voice, and the like). During the enrollment process, the user may be required to provide a biometric input multiple times with slightly different variations, such as by changing the pose, orientation, and/or offset of the biometric input. This is to ensure robust performance of the biometric sensors during authentication. Once the enrollment process is completed, the biometric sensors may be configured and/or trained to recognize the user's biometric signature. Accordingly, the biometric sensors may be used to authenticate the user in response to subsequent biometric inputs.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

A system and method for providing an on-demand user interface for an input device is disclosed. One innovative aspect of the subject matter of this disclosure can be implemented in a system including a first device and a second device. The first device is configured to receive a first user input and select a first notification from a plurality of notifications stored on the first device based at least in part on the first user input. The first device then outputs the first notification using one or more hardware resources. The second device detects the first notification output by the first device and matches the first notification to a first content item stored on the second device. The first content item includes instructions for providing a second user input on the first device. The second device then renders the first content item on a display. The first device further receives the second user input subsequent to the first user input.

Another innovative aspect of the subject matter of this disclosure can be implemented in a display device including a display, one or more processors, and a memory. The memory stores instructions that, when executed by the one or more processors, cause the display device to detect a notification output by an input device; match the notification to a content item stored on the second device, where the content item includes instructions for providing a user input on the input device; and render the content item on the display.

BRIEF DESCRIPTION OF THE DRAWINGS

The present embodiments are illustrated by way of example and are not intended to be limited by the figures of the accompanying drawings.

DETAILED DESCRIPTION

Figure 1:
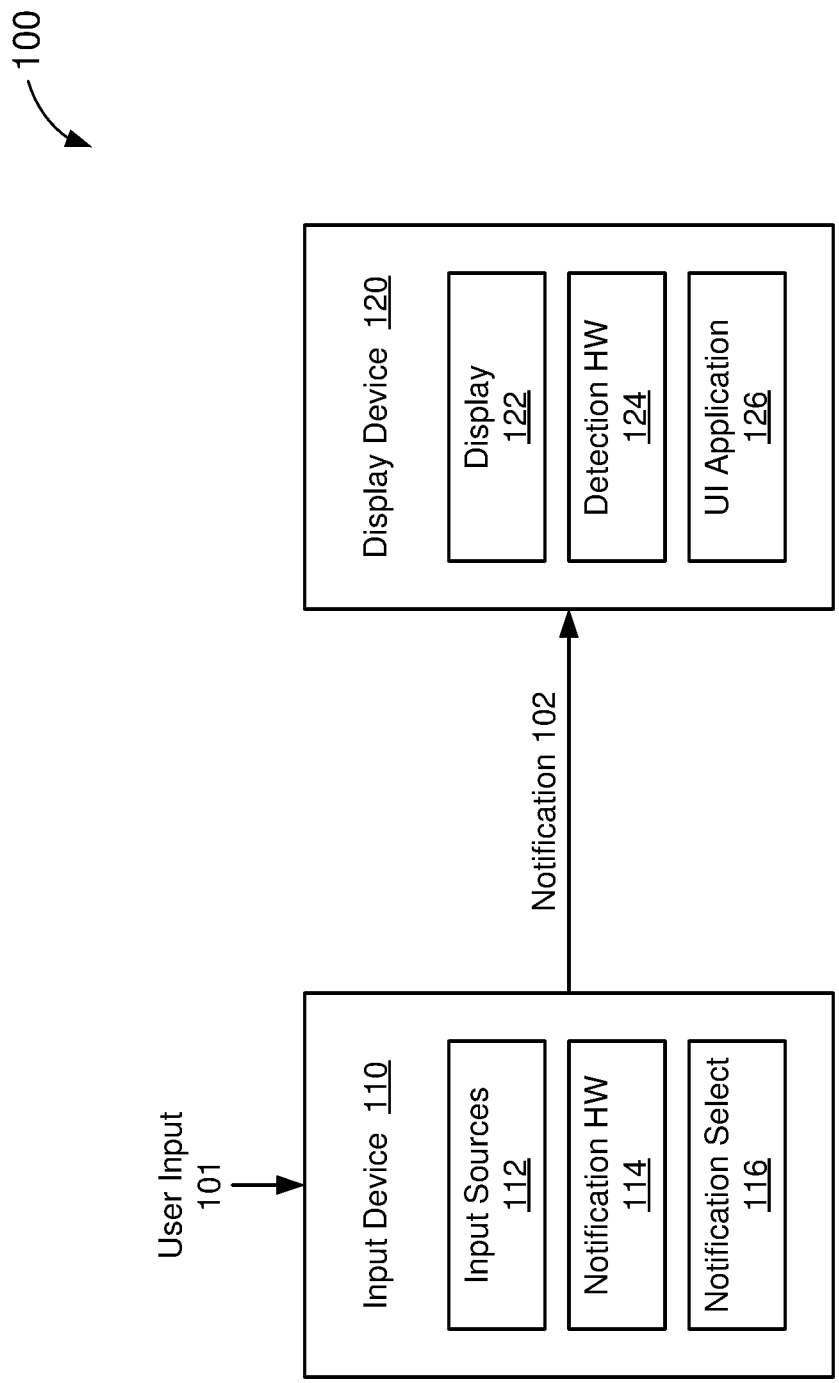
FIG. 1 shows an example input processing system within which the present embodiments may be implemented.

In the following description, numerous specific details are set forth such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the aspects of the disclosure. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory. The interconnection between circuit elements or software blocks may be shown as buses or as single signal lines. Each of the buses may alternatively be a single signal line, and each of the single signal lines may alternatively be buses, and a single line or bus may represent any one or more of a myriad of physical or logical mechanisms for communication between components.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory computer-readable storage medium comprising instructions that, when executed, performs one or more of the methods described above. The non-transitory computer-readable storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors. The term "processor," as used herein may refer to any general-purpose processor, conventional processor, controller, microcontroller, and/or state machine capable of executing scripts or instructions of one or more software programs stored in memory.

FIG. 1 shows an example input processing system 100 within which the present embodiments may be implemented. In some embodiments, the input processing system 100 may provide an on-demand electronic display for a display-less input device. The input processing system 100 includes an input device 110 and a display device 120.

The input device 110 may be configured to receive and process user inputs 101. In some embodiments, the input device 110 may be a complete electronic system. For example, the input device 110 may be configured to perform one or more functions in response to the user inputs 101. Example actions may include, but are not limited to, unlocking a door, opening an automated (e.g., garage) door, changing the channel on a television, or changing an operation mode of the input device 110. Further, in some embodiments, the input device 110 may be a display-less device. As used herein, the term "display-less" may refer to any device that does not contain, nor is permanently coupled to, an electronic display (including any hardware capable of displaying and/or projecting a rich user interface). Example suitable input devices may include, but are not limited to, composite input devices (e.g., physical keyboards, joysticks, key switches, key fobs, and the like) and data input devices (e.g., remote controls, mice, touch pads, and the like).

The input device 110 includes one or more input sources 112, notification hardware (HW) 114, and a notification selector 116. The input sources 112 may be configured to receive the user inputs 101. In some embodiments, the input sources 112 may include electrical or mechanical actuators (e.g., buttons, switches, toggles, capacitive sensors, and the like). For example, the actuators may be used to provide data and/or selection inputs to the input device 110. In some other embodiments, the input sources 112 may include device sensors (e.g., accelerometers, gyroscopes, magnetometers, photosensors, temperature sensors, pressure transducers, and the like). Still further, in some embodiments, the input sources 112 may include biometric sensors (e.g., cameras, microphones, fingerprint scanners, and the like). For example, the biometric sensors may be used to provide biometric inputs to the input device (e.g., for authentication purposes). In some embodiments, authentication may be required to unlock certain features and/or operations of the input device 110 (such as unlocking a door).

The notification hardware 114 may be configured to output one or more notifications 102 about the user input 101 and/or the input device 110. In some embodiments, the notification hardware 114 may include one or more light sources and/or speakers to provide a simply user interface that can be used to communicate notification information to the user. For example, a blinking green light or gentle beeping sound may be used to confirm that a user input 101 was successfully processed. On the other hand, a blinking red light or harsh beeping sound may be used to indicate that a user input 101 was not processed successfully and/or the input device 110 is in a low-battery or error state. The notification selector 116 may be configured to select the appropriate notification to be output or otherwise manifested via the notification hardware 114. In some embodiments, the notification selector 116 may select each notification from a database of preconfigured notifications stored on the input device 110 (not shown for simplicity).

Because the input device 110 lacks an electronic display, the notification hardware 114 may serve as a simple or rudimentary user interface (UI) through which the input device 110 may communicate with the user. However, aspects of the present disclosure recognize that a richer UI (e.g., capable of providing more detailed information and/or instructions) may be desirable for certain tasks, such as communicating complex instructions to the user. For example, during the process of enrolling a biometric signature (e.g., to be used for authentication), the user may be required to provide a biometric input multiple times with slightly different variations, such as by changing the pose, orientation, and/or offset of the biometric input. Thus, it may be desirable to display a visual guide for how to provide the biometric input at each step of the enrollment process. Electronic displays are well-suited for a rich UI that can be used to guide the user to provide more complex inputs.

It is noted, however, that electronic displays are expensive and consume large amounts of processing resources and power. Moreover, the size of the display surface may directly affect the richness of the UI. For example, richer UIs tend to occupy larger display areas. Aspects of the present disclosure further recognize that the input device 110 may be used primarily in the authentication mode, and that enrollment operations tend to be triggered very infrequently. Thus, the input device 110 may not benefit from having an electronic display for a majority of its operation. Such low frequency of use may not outweigh the cost or sacrifices in performance, battery life, size and/or design needed to incorporate a permanent display into the input device 110.

In some embodiments, the display device 120 may be configured to operate as an on-demand display for the input device 110. The display device 120 may be any electronic system containing an electronic display (including any hardware capable of displaying and/or projecting a rich user interface). Examples of suitable electronic systems may include, but are not limited to, personal computing devices (e.g., desktop computers, laptop computers, netbook computers, tablets, web browsers, e-book readers, personal digital assistants (PDAs), and the like), data output devices (e.g., display screens and printers, and the like), remote terminals, kiosks, video game machines (e.g., video game consoles, portable gaming devices, and the like), communication devices (e.g., cellular phones such as smart phones), media devices (e.g., recorders, editors, and players such as televisions, set-top boxes, music players, digital photo frames, digital cameras, and the like), and in-car entertainment systems or controls.

In some embodiments, the input device 110 may use the notification hardware 114 to communicate information to be displayed on the display device 120. At least some of the notifications 102 generated by the input device 110 may correspond to rich media content that can be rendered or displayed on the display device 120. For example, each content item on the display device 120 may be triggered by a unique pattern or sequence of lights and/or sounds emitted by the input device 110. When the display device 120 detects a particular notification 102 output by the input device 110, the display device 120 may display an image or video associated with the detected notification. Accordingly, the display device 120 may provide a rich UI for guiding or instructing the user to perform complex tasks or user inputs 101 on the input device 110.

The display device 120 includes a display 122, detection hardware (HW) 124, and a user interface (UI) application 126. The display 122 may be any type of electronic display capable of displaying a rich UI. In some aspects, the display 122 may include any hardware capable of rendering digital images (e.g., fixed pixel displays, raster scan displays, and the like) and/or displaying or projecting non-digital images (e.g., seven-segment displays, fixed-icon displays, and other non-bitmapped displays). Example suitable display technologies may include, but are not limited to, light emitting diode (LED), organic LED (OLED), cathode ray tube (CRT), liquid crystal display (LCD), plasma, and electroluminescence (EL). In some aspects, the display 122 may be integrated as a physical part of the display device 120. In some other aspects, the display 122 may be physically separated from the display device 120. For example, the display device 120 may be coupled to (and communicate with) the display 122 using various wired and/or wireless interconnection and communication technologies, such as buses and networks. Examples technologies may include Inter-Integrated Circuit (I²C), Serial Peripheral Interface (SPI), PS/2, Universal Serial bus (USB), Bluetooth®, Infrared Data Association (IrDA), and various radio frequency (RF) communication protocols defined by the IEEE 802.11 standard.

The detection hardware 124 may be configured to detect one or more notifications 102 output by the input device 110. In some aspects, the detection hardware 124 implemented by the display device 120 may depend, at least in part, on the notification hardware 114 implemented by the input device 110. For example, if input device 110 outputs a notification 102 using one or more light sources, the display device 120 may detect the notification 102 (e.g., light) using one or more cameras or photosensors. On the other hand, if the input device 110 outputs a notification 102 using one or more speakers, the display device 120 may detect the notification 102 (e.g., sound) using one or more microphones. Still further, in some embodiments, the input device 110 may output a notification 102 using one or more radio-frequency (RF) transmitters. Accordingly, the display device 120 may detect the notification 102 (e.g., RF signal) using one or more RF receivers.

The UI application 126 may be configured to interpret and/or process the notifications 102 detected by the detection hardware 124. In some embodiments, the UI application 126 may generate and/or update a rich UI on the display 122 in response to notifications 102 output by the input device 110. More specifically, the UI application 126 may select the appropriate content to be rendered on the display 122 (e.g., as part of the rich UI) based, at least in part, on the detected notification 102. For example, the UI application 126 may match the detected notification 102 to a particular content item (e.g., image, video, or other media content) stored on, or otherwise accessible by, the display device 120. In some aspects, the content items to be rendered on the display 122 may include instructions for performing a complex task or providing a user input on the input device 110. In a particular embodiment, the UI application 126 may display a step-by-step guide for initiating and/or completing a biometric enrollment process.

For example, when enrolling a biometric signature, the notification selector 116 may select a notification 102 that corresponds to an instruction for providing a biometric input at a given step of the enrollment process. The input device 110 may output the selected notification 102 via the notification hardware 114 (e.g., as a unique pattern of lights and/or sounds). The detection hardware 124 detects the notification 102 output by the input device 110. The UI application 126 matches the detected notification 102 to a corresponding content item stored on the display device 120 and renders the corresponding content item on the display 122. For example, the content item may include the visual guide for providing the next biometric input of the enrollment process. More specifically, the visual guide may include detailed (e.g., graphical) instructions or directions for how to provide the next biometric input (e.g., including the angle, pose, or offset at which the input is to be provided). This process may be repeated until the enrollment operation is completed.

Accordingly, the display device 120 of the present embodiments may provide an on-demand electronic display when a rich UI is desired for the input device 110 (e.g., when performing complex tasks or user inputs 101). As a displayless device, the input device 110 may retain a small form factor and relatively low hardware complexity. Further, aspects of the present disclosure may leverage the existing hardware of the input device 110 (e.g., used for simple notifications) to communicate UI-specific information to the display device 120. Accordingly, various types of display devices may be configured to detect and interpret the notifications output by the input device 110. Moreover, the input device 110 need not have a priori knowledge of the display device 120 in order to communicate UI-specific information to the display device 120.

The present embodiments further enable the input device 110 to be used independently of the display device 120 when a rich UI is no longer needed. Aspects of the present disclosure recognize that, after the input device 110 has been trained to recognize or authenticate the user's biometric signature, the input device 110 may rarely (if ever) need to operate in the enrollment mode again. As described above, the display device 120 may provide little (if any) benefit to the operation of the input device 110 in the authentication mode. The input processing system 100 enables the input device 110 to be operated by itself (e.g., as a self-contained electronic system), without the display device 120.

In a particular embodiment, the input device 110 may be a car key fob and the display device 120 may be a smart phone. The key fob may require user authentication (e.g., via a fingerprint scanner) before allowing access to one or more vehicle controls (such as unlocking the doors or turning on the engine). The smart phone may provide a rich UI during an enrollment process, such as by detecting patterns of light and/or sound emitted by the key fob, which may guide the user in providing biometric inputs (e.g., fingerprints) on the key fob. However, once the key fob has been trained to recognize or detect the user's biometric signature, the smart phone may no longer be needed for subsequent operation of the key fob. For example, the user may authenticate herself on the key fob, and thereafter gain access to the car, without the smart phone (or any other display device) present.

In addition to displaying instructions for interacting with the input device 110, the display device 120 may also display information about the input device 110. Example information may include, but is not limited to, battery level, number of attempted authentication attempts, and number of operations (e.g., door unlocks) performed per authentication. In some embodiments, the input device 110 and display device 120 may further be configured for bi-directional communications. For example, the display device 120 may include notification hardware similar to the notification hardware 114 of the input device, and the input device 110 may include detection hardware similar to the detection hardware 124 of the display device.

Figure 2:
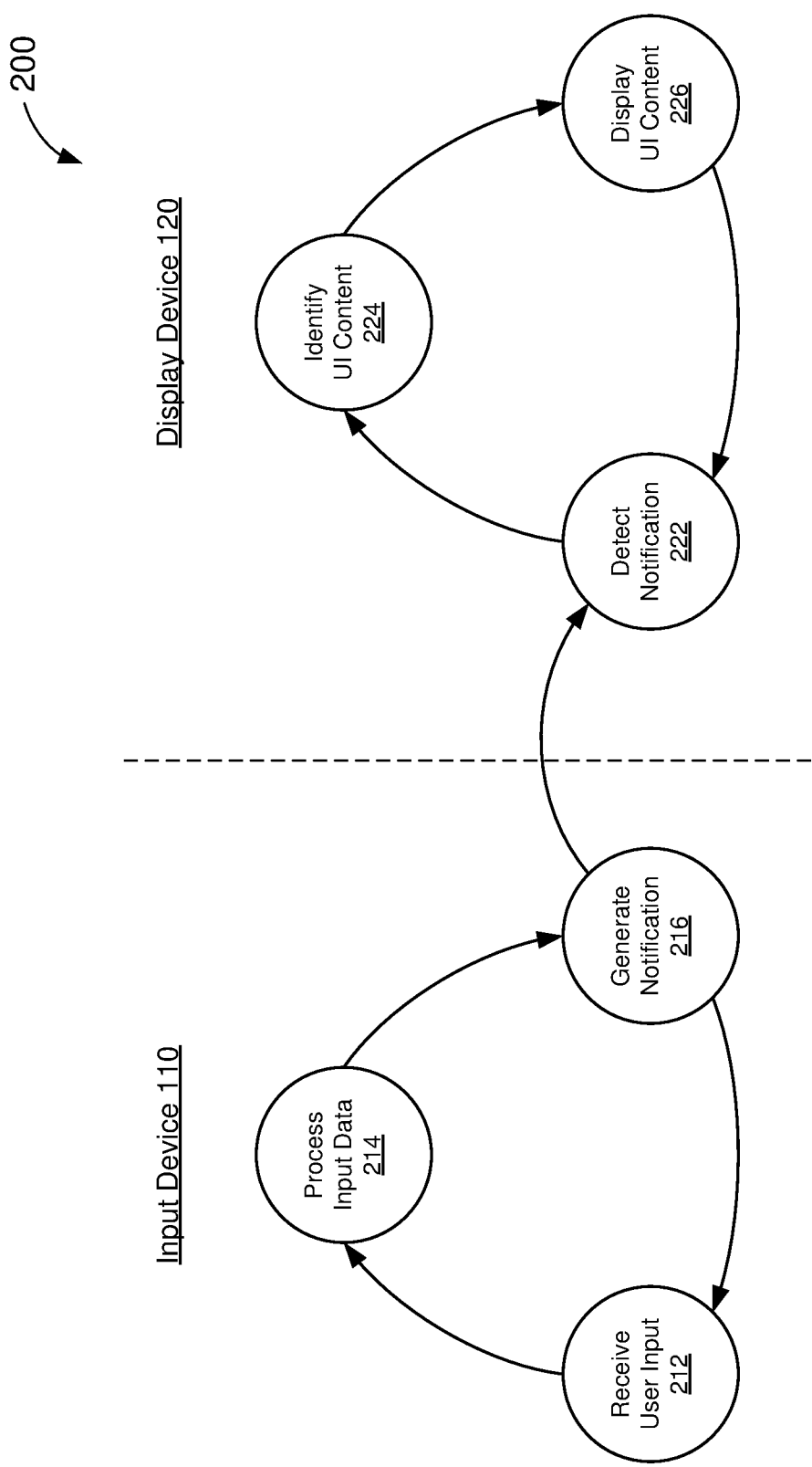
FIG. 2 is a state diagram depicting an example operation of the input processing system of FIG. 1, in accordance with some embodiments.

FIG. 2 is a state diagram 200 depicting an example operation of the input processing system 100 of FIG. 1, in accordance with some embodiments. More specifically, the state diagram 200 shows an example interaction between the input device 110 and the display device 120 for purposes of providing an on-demand electronic display for a display-less device. It is noted, from the example of FIG. 2, that the input device 110 is a complete electrical system and does not depend on the display device 120 to operate. In other words, none of the operating states (212-216) of the input device 110 depend on any of the operating states (222-226) of the display device 120.

The input device 110 may receive a user input 212, process the input data 214, and generate a notification as a result of the processing 216. In some embodiments of state 212, the input sources 112 may receive a biometric input while the input device is operating in an enrollment mode. For example, the biometric input may contain one or more biometric signatures of the user. In some embodiments of state 214, the input device 110 may be trained or otherwise configured to recognize the biometric signature of the user from a given type of biometric input. For example, the input device 110 may generate or update a biometric profile which may be used to authenticate subsequent biometric inputs by the user. In some embodiments of state 216, the input device 110 may output a notification corresponding to an instruction for providing another user input on the input device 110. In some aspects, the notification may be output using existing notification hardware (e.g., lights, speakers, RF transmitters, and the like) on the input device 110. Then, returning to state 212, the input device 110 may receive the next user input for the next step of the enrollment process.

The display device 120 may detect the notification 222, identify UI content associated with the notification 224, and display the UI content on an electronic display 226. In some embodiments of state 222, the display device 120 may detect the notifications when the detection hardware 124 is positioned within a threshold range of the notification hardware 114. In some aspects, the notification may be detected using existing sensors (e.g., cameras, microphones, RF receivers, and the like) on the display device 120. In some embodiments of state 224, the display device 120 may execute the UI application 236 to identify the pattern or sequence of notifications (e.g., lights, sounds, RF signals, and the like) output by the input device 110. For example, the UI application 126 may match the detected notification to a particular content item stored on, or otherwise accessible by, the display device 120. In some embodiments of state 226, the UI application 126 may render the matching content item on a display of the display device 120. For example, the displayed content item may provide a visual guide and/or list of instructions for providing the next user input on the input device 110.

It is noted that the input device 110 may receive the next user input (at 212) after generating the notification (at 216) and does not depend on any action from the display device 120. In other words, the input device 110 may operate entirely independent of the display device 120. Thus, while the display device 120 may display a rich UI which may help guide the user's interactions with the input device 110, the rich UI is not necessary to the operation of the input device 110. For example, an experienced user who is familiar with the enrollment process may already know how to provide each subsequent user input (at 212) even without the assistance of the display device 120.

Figure 3:
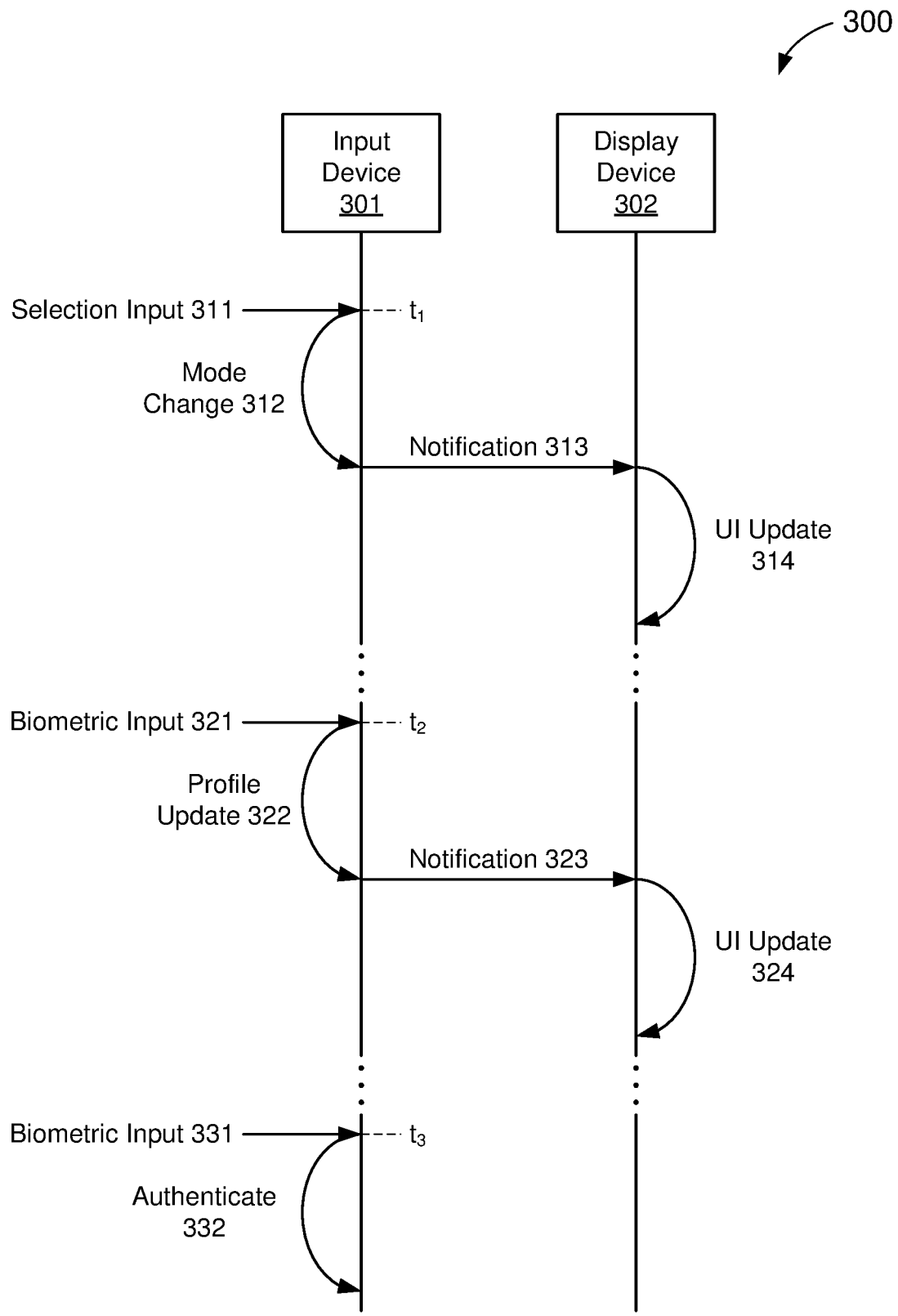
FIG. 3 is a timing diagram depicting an example operation of a biometric authentication system, in accordance with some embodiments.

FIG. 3 is a timing diagram depicting an example operation of a biometric authentication system 300, in accordance with some embodiments. The biometric authentication system 300 includes an input device 301 and a display device 302. The input device 301 and display device 302 may be example embodiments of the input device 110 and display device 120, respectively, of FIG. 1. In some embodiments, the input device 301 may be a display-less device and the display device 302 may be configured to operate as an on-demand electronic display for the input device 301.

At time $t_1$, the input device 301 receives a selection input 311. In some embodiments, the selection input 311 may be provided using one or more electrical or mechanical actuators of the input device 301. For example, the selection input 311 may correspond to one or more button presses. The input device 301 may change its operation mode 312 in response to the selection input 311. For example, the input device 301 may switch from an authentication mode to an enrollment mode. The input device 301 may then generate a notification 313 based, at least in part, on the mode change 312. For example, the input device 301 may select a particular notification associated with a set of instructions and/or guide for enrolling or managing (e.g., adding and deleting) biometric signatures and/or profiles. The notification 313 may be output via notification hardware on the input device 301. In some embodiments, the notification hardware may include lights, speakers, RF transmitters, and/or other existing hardware resources of the input device 301 (e.g., hardware that may serve a function other than communicating UI information to a display device).

The display device 302 detects the notification 313 and renders a UI update 314 based, at least in part, on the detected notification 313. For example, the notification 313 may be detected via one or more sensors of the display device 302. In some embodiments, the sensors may include cameras, microphones, RF receivers, and/or other existing hardware resources of the display device 302 (e.g., hardware that may serve a function other than receiving UI information from an input device). A UI application executing on the display device 302 matches the detected notification 313 to a particular content item stored on, or accessible by, the display device 302. The UI application further renders the matching content item on an electronic display (e.g., as part of a rich UI). For example, the displayed content item may provide a visual guide and/or set of instructions for inputting a biometric signature on the input device 301.

At time $t_2$, the input device 301 receives a biometric input 321. In some embodiments, the biometric input 321 may be provided using one or more biometric sensors of the input device 301. For example, the biometric input 321 may correspond to a scan or recording of a user's fingerprint, face, voice, or other biometric feature. The input device may update a biometric profile 322 for the user based at least in part on the biometric input 321. For example, the input device 301 may operate in the enrollment mode when the biometric input 321 is received. Thus, an authentication application executing on the input device 301 may be trained (or further refined) to recognize the user's biometric signature from the biometric input 321. The input device 301 may then generate a notification 323 based, at least in part, on the profile update 322. For example, the input device 301 may select a particular notification associated with a set of instructions and/or guide for providing another biometric input (e.g., as part of the enrollment process). The notification 323 may again be output via the notification hardware on the input device 301.

The display device 302 detects the notification 323 and renders a UI update 324 based, at least in part, on the detected notification 323. For example, the notification 323 may again be detected via the one or more sensors of the display device 302. The UI application matches the detected notification 323 to another content item stored on, or accessible by, the display device 302. The UI application further renders the matching content item on the electronic display (e.g., as part of the rich UI). For example, the display content item may provide a visual guide and/or set of instructions for inputting another biometric signature on the input device 301. As described above, during the enrollment process, the user may be required to provide multiple biometric inputs with slight variations (e.g., in angle, pose, and/or offset). Thus, the UI update 324 may display to the user the exact angle, pose, and/or offset at which the next biometric input is to be provided on the input device 301.

At time $t_3$, the input device 301 receives another biometric input 331. The biometric input 331 may again be provided using the biometric sensors of the input device 301. However, at this time, the input device 301 is no longer operating in the enrollment mode. In some embodiments, the input device 301 may revert back to the authentication mode (e.g., from the enrollment mode) once the enrollment process is completed. In some aspects, the input device 301 may be configured to automatically switch to the authentication mode after receiving (and processing) the last biometric input of the enrollment process. In some other aspects, the input device 301 may be manually switched to the authentication mode via one or more button presses. Accordingly, the input device 301 may authenticate the user 332 based on the biometric input 331 received at time $t_3$. For example, the authentication application of the input device 301 may authenticate the user by comparing the biometric input 331 with one or more biometric profiles stored on the input device 301.

It is noted that, while operating in the authentication mode, the input device 301 may not communicate any UI information to the display device 302. In some embodiments, the input device 301 may not output any notifications in response to the biometric inputs 331 received while operating in the authentication mode. In some other embodiments, the input device 301 may continue to output basic notifications (such as a green light or a red light) in response to biometric inputs 331 for purposes of indicating whether the authentication was successful. However, such notifications may be easily interpreted by the user, and may not trigger any UI updates on the display device 302. Moreover, aspects of the present disclosure recognize that the input device 301 may remain in the authentication mode for a majority of its operation. Thus, the present embodiments provide the input device 301 the freedom to operate as a standalone display-less device, untethered from the display device 302.

Figure 4A:
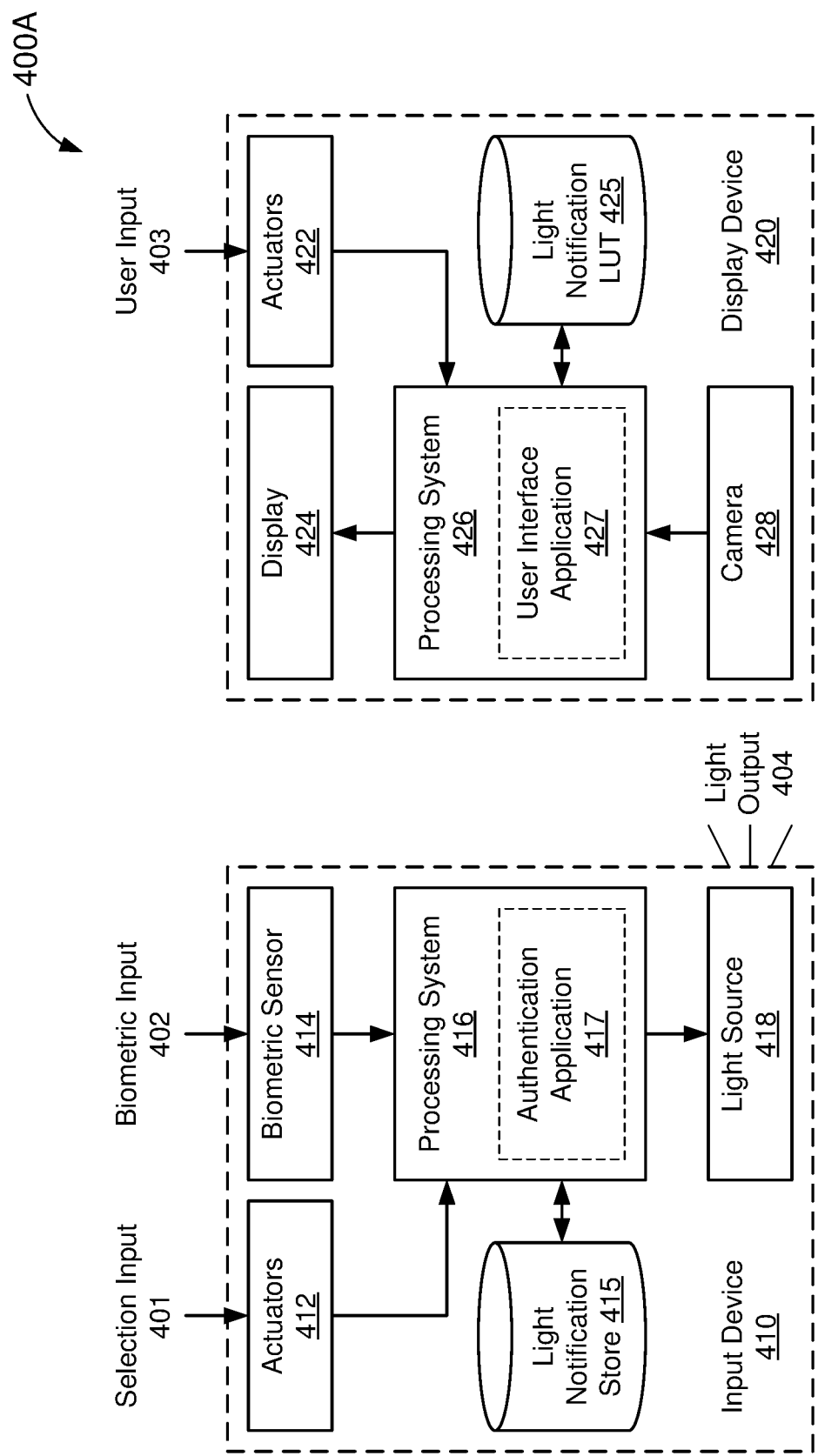
FIGS. 4A-4C are block diagrams of biometric authentication systems, in accordance with some embodiments.

FIG. 4A is a block diagram of a biometric authentication system 400A, in accordance with some embodiments. The biometric authentication system 400A includes an input device 410 and a display device 420. The input device 410 and display device 420 may be example embodiments of the input device 110 and display device 120, respectively, of FIG. 1. In some embodiments, the input device 410 may be a display-less device and the display device 420 may be configured to operate as an on-demand electronic display for the input device 410.

The input device 410 includes one or more actuators 412, a biometric sensor 414, a processing system 416, and a light source 418. The actuators 412 are configured to receive a selection input 401. Example actuators may include, but are not limited to, buttons, switches, toggles, and capacitive sensors. The selection input 401 may be used to make a selection, input data, change an operation mode of the input device 410, and/or cause the input device 410 to perform a particular function. The biometric sensor 414 is configured to receive a biometric input 402. Example biometric sensors may include, but are not limited to, cameras, microphones, and fingerprint scanners. The biometric input 402 may include a user's biometric signature and may be used for authentication purposes. The light source 418 is configured to output light 404. Example light sources may include, but are not limited to, LEDs, lasers, EL materials, and any other photonic devices capable of emitting light in the visible spectrum, the infrared spectrum, and/or the ultraviolet spectrum. The light output 404 may provide notifications about the inputs 401 and 402 and/or a status of the input device 410.

The processing system 416 is configured to process the inputs 401 and 402 received via the actuators 412 and biometric sensor 414, respectively. In some embodiments, the processing system 416 may be implemented as a set of firmware and/or software modules. Example modules may include hardware operation modules for operating hardware such as the actuators 412, biometric sensor 414 and light source 418, and data processing modules for processing data associated with the selection input 401 and biometric input 402. In some embodiments, the processing system 416 may include an authentication application 417 to authenticate and/or enable a user to access one or more functions or features of the input device 410. For example, the authentication application 417 may be configured to operate the actuators 412 and biometric sensor 414; enroll the biometric signature of a user; authenticate a user based on the his or her biometric signature; and change an operation mode of the input device 410, such as between an authentication mode and an enrollment mode.

In some embodiments, the authentication application 417 may further control the light output 404 from the light source 418 based, at least in part, on the inputs 401 and/or 402. For example, the authentication application 417 may control the light source 418 to output a green light to acknowledge a selection input 401 and/or successful authentication attempt and to output a red light to indicate an error and/or unsuccessful authentication attempt. In some aspects, the authentication application 417 may further control the light source 418 to output a unique pattern of lights corresponding to a rich UI to be displayed on the display device 420. For example, the authentication application 417 may change the color, intensity, duration, and/or number of pulses of the light output 404 for each UI-specific light pattern. In some embodiments, the input device 410 may include a light notification store 415 to store each of the light patterns that can be output by the light source 418. For example, while operating in the enrollment mode, the authentication application 417 may retrieve a different light pattern from the light notification store 415 at each step of the enrollment process.

The display device 420 includes one or more actuators 422, a display 424, a processing system 426, and a camera 428. The actuators 422 are configured to receive user inputs 403. Example actuators 412 may include, but are not limited to, buttons, switches, toggles, and capacitive sensors. The user inputs 403 may be used to control and/or operate the display device 420. The display 424 may be configured to provide a rich UI on the display device 420. Example displays may include any hardware capable of rendering digital images and/or displaying or projecting non-digital images. Example display technologies may include, but are not limited, LED, OLED, CRT, LCD, plasma, and EL displays. The rich UI may include digital images, text, video, and/or other media content. The camera 428 is configured to detect the light output 404 by the input device 410. Example cameras may include, but are not limited to, photodiodes, CMOS image sensor arrays, CCD arrays, and any other photosensors capable of detecting wavelengths of light in the visible spectrum, the infrared spectrum, and/or the ultraviolet spectrum.

The processing system 426 is configured to process the light patterns detected by the camera 428. In some embodiments, the processing system 426 may be implemented as a set of firmware and/or software modules. Example modules may include hardware operation modules for operating hardware such as the actuators 422, display 424, and camera 428, and data processing modules for processing data associated with the detected light patterns. In some embodiments, the processing system 426 may include a user interface (UI) application 427 to enable or otherwise facilitate user interactions with the display device 420. For example, the UI application 427 may be configured to operate the actuators 422, display 424, and camera 428; render media content on the display 424; and respond to user input 403 by triggering one or more actions. Example actions include changing an operation mode of the display device 420 and/or graphical user interface (GUI) actions such as cursor movement, selection, menu navigation, and the like.

In some embodiments, the UI application 427 may generate and/or update a rich UI on the display 424 to further facilitate user interactions with the input device 410. In some aspects, the UI application 427 may select media content to be rendered on the display 424 based, at least in part, on the user inputs 403 received via the actuators 422. For example, in response to the user input 403, the UI application 427 may display a combination of selection inputs 401 for placing the input device 410 in an enrollment mode. In some other aspects, the UI application 427 may select the media content to be rendered on the display 424 based, at least in part, on the light output 404 by the input device 410. For example, the UI application 427 may match the detected light pattern to a particular content item that can be rendered on the display 424. In some embodiments, the display device 420 may include a light notification lookup table (LUT) 425 that can be used to match the detected light pattern to a corresponding content item. For example, each entry in the LUT 425 may correspond to a respective notification (e.g., light pattern) stored in the light notification store 415.

In some other embodiments, the camera 428 may be used to detect a selection input 401 and/or biometric input 402 on the input device 410. For example, the camera 418 may capture one or more images of a user interacting with the actuators 412 or biometric sensor 414 of the input device 410. The UI application 427 may determine from the captured images (e.g., using image processing techniques) that the user interaction triggered a particular operation (or the next step of an operation) on the input device 410. The UI application 427 may then render the appropriate media content on the display 424 based on the operation (or step of the operation) most recently triggered on the input device 410. In this manner, the display device 420 may generate and/or update the rich UI on the display 424 without receiving any notifications from the input device 410.

Figure 4B:
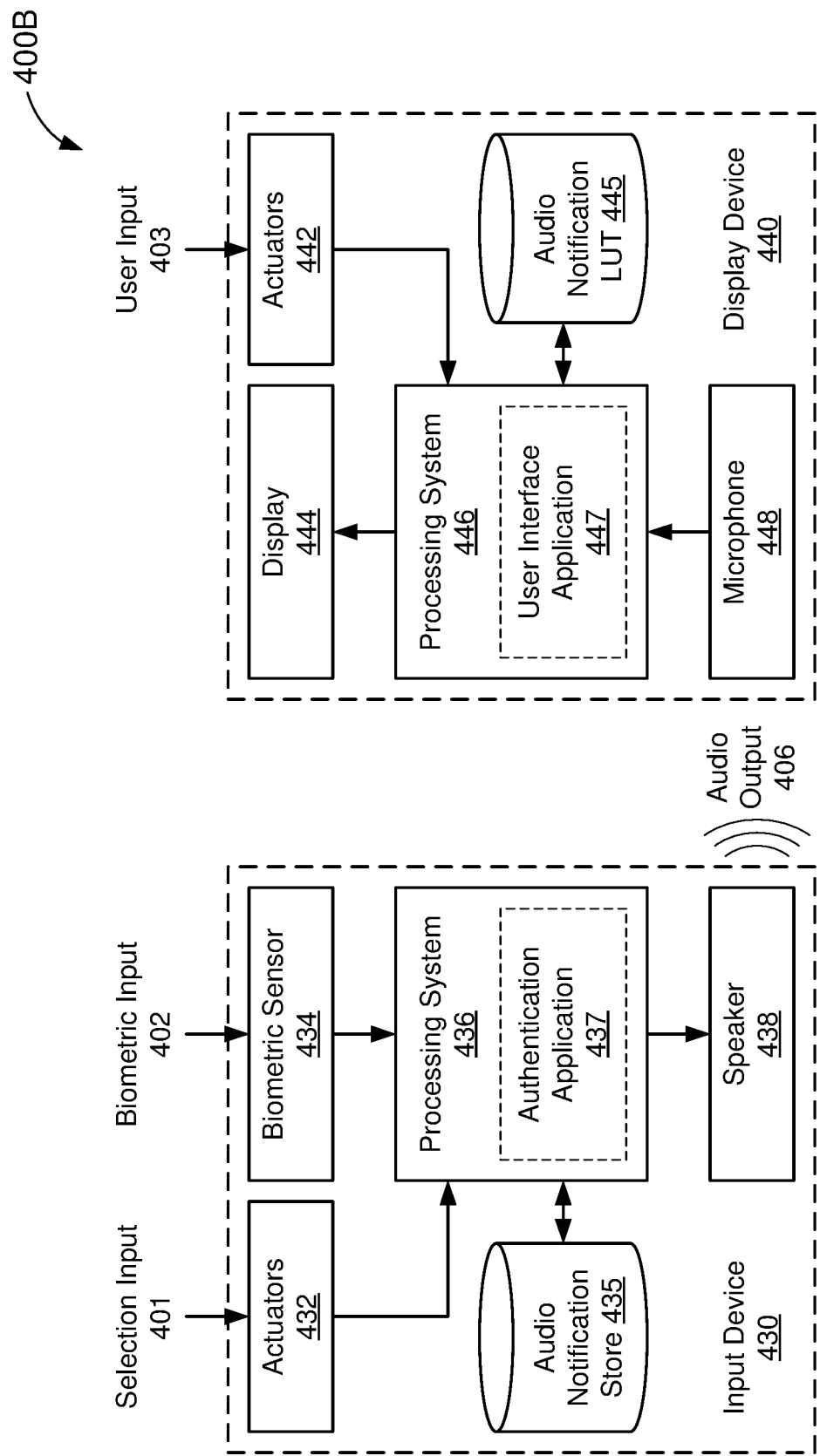

FIG. 4B is a block diagram of a biometric authentication system 400B, in accordance with some embodiments. The biometric authentication system 400B includes an input device 430 and a display device 440. The input device 430 and display device 440 may be example embodiments of the input device 110 and display device 120, respectively, of FIG. 1. In some embodiments, the input device 430 may be a display-less device and the display device 440 may be configured to operate as an on-demand electronic display for the input device 430.

The input device 430 includes one or more actuators 432, a biometric sensor 434, a processing system 436, and a speaker 438. The actuators 432 and biometric sensor 434 may be example embodiments of the actuators 412 and biometric sensor 414, respectively, of FIG. 4A. Thus, the actuators 432 are configured to receive a selection input 401 and the biometric sensor 434 is configured to receive a biometric input 402. The speaker 438 is configured to output audio 406. Example speakers may include, but are not limited to, full-range drivers, mid-range drivers, coaxial drivers, tweeters, woofers, and any other electromechanical devices capable of producing sounds in the audible range, supersonic range, and/or subsonic range. The audio output 406 may provide notifications about the inputs 401 and 402 and/or a status of the input device 430.

The processing system 436 is configured to process the inputs 401 and 402 received via the actuators 432 and biometric sensor 434, respectively. In some embodiments, the processing system 436 may be implemented as a set of firmware and/or software modules. Example modules may include hardware operation modules for operating hardware such as the actuators 432, biometric sensor 434 and speaker 438, and data processing modules for processing data associated with the selection input 401 and biometric input 402. In some embodiments, the processing system 436 may include an authentication application 437 to authenticate and/or enable a user to access one or more functions or features of the input device 430. For example, the authentication application 437 may be configured to operate the actuators 432 and biometric sensor 434; enroll the biometric signature of a user; authenticate a user based on the his or her biometric signature; and change an operation mode of the input device 430, such as between an authentication mode and an enrollment mode.

In some embodiments, the authentication application 437 may further control the audio output 406 from the speaker 438 based, at least in part, on the inputs 401 and/or 402. For example, the authentication application 437 may control the speaker 438 to output a gentle beep to acknowledge a selection input 401 and/or successful authentication attempt and to output a harsh beep to indicate an error and/or unsuccessful authentication attempt. In some aspects, the authentication application 437 may further control the speaker 438 to output a unique pattern of sounds corresponding to a rich UI to be displayed on the display device 440. For example, the authentication application 437 may change the pitch, volume, duration, and/or number of pulses of the audio output 406 for each UI-specific light pattern. In some embodiments, the input device 430 may include an audio notification store 435 to store each of the audio patterns that can be output by the speaker 438. For example, while operating in the enrollment mode, the authentication application 437 may retrieve a different audio pattern from the audio notification store 435 at each step of the enrollment process.

The display device 440 includes one or more actuators 442, a display 444, a processing system 446, and a microphone 448. The actuators 442 and display 444 may be example embodiments of the actuators 422 and display 424, respectively, of FIG. 4A. Thus, the actuators 442 are configured to receive user inputs 403 and the display 444 is configured to provide a rich UI on the display device 440. The microphone 448 is configured to detect the audio output 406 by the input device 430. Example microphones may include, but are not limited to, microphone arrays, omnidirectional, unidirectional, or bi-directional microphones, and any other transducers capable of converting sound waves in the audible range, supersonic range, and/or subsonic range into electrical signals.

The processing system 446 is configured to process the audio patterns detected by the microphone 448. In some embodiments, the processing system 446 may be implemented as a set of firmware and/or software modules. Example modules may include hardware operation modules for operating hardware such as the actuators 442, display 444, and microphone 448, and data processing modules for processing data associated with the detected audio patterns. In some embodiments, the processing system 446 may include a user interface (UI) application 447 to enable or otherwise facilitate user interactions with the display device 440. For example, the UI application 447 may be configured to operate the actuators 442, display 444, and microphone 448; render media content on the display 444; and respond to user input 403 by triggering one or more actions. Example actions include changing an operation mode of the display device 440 and/or GUI actions such as cursor movement, selection, menu navigation, and the like.

In some embodiments, the UI application 447 may generate and/or update a rich UI on the display 444 to further facilitate user interactions with the input device 430. In some aspects, the UI application 447 may select media content to be rendered on the display 444 based, at least in part, on the user inputs 403 received via the actuators 442. For example, in response to the user input 403, the UI application 447 may display a combination of selection inputs 401 for placing the input device 430 in an enrollment mode. In some other aspects, the UI application 447 may select the media content to be rendered on the display 444 based, at least in part, on the audio output 406 by the input device 430. For example, the UI application 447 may match the detected audio pattern to a particular content item that can be rendered on the display 444. In some embodiments, the display device 440 may include an audio notification LUT 445 that can be used to match the detected audio pattern to a corresponding content item. For example, each entry in the LUT 445 may correspond to a respective notification (e.g., audio pattern) stored in the audio notification store 435.

Figure 4C:
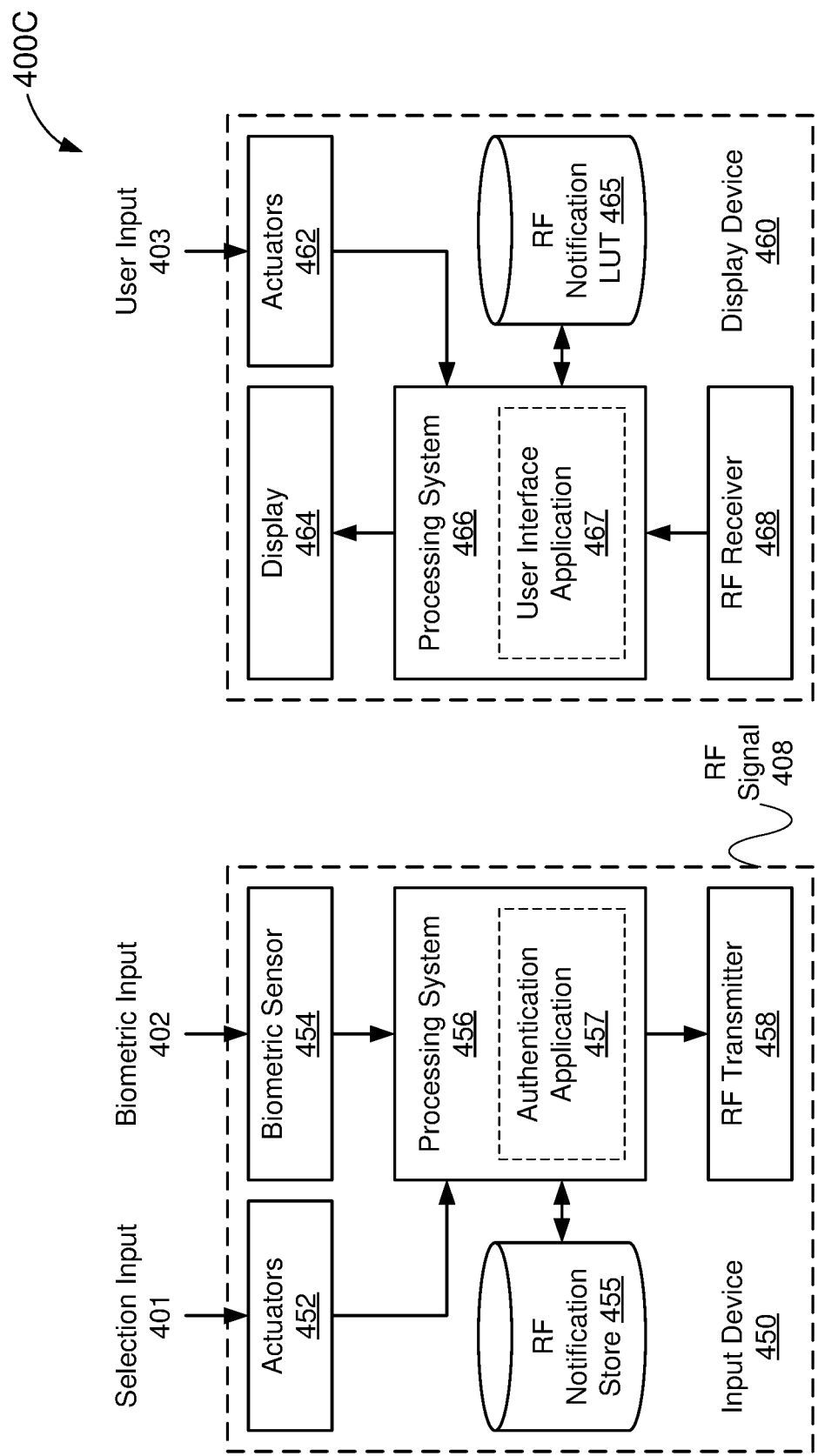

FIG. 4C is a block diagram of a biometric authentication system 400C, in accordance with some embodiments. The biometric authentication system 400C includes an input device 450 and a display device 460. The input device 450 and display device 460 may be example embodiments of the input device 110 and display device 120, respectively, of FIG. 1. In some embodiments, the input device 450 may be a display-less device and the display device 460 may be configured to operate as an on-demand electronic display for the input device 450.

The input device 450 includes one or more actuators 452, a biometric sensor 454, a processing system 456, and an RF transmitter 458. The actuators 452 and biometric sensor 454 may be example embodiments of the actuators 412 and biometric sensor 414, respectively, of FIG. 4A. Thus, the actuators 452 are configured to receive a selection input 401 and the biometric sensor 454 is configured to receive a biometric input 402. The RF transmitter 458 is configured to output an RF signal 408. Example RF transmitters may include, but are not limited to, near-field communication (NFC) radios, Bluetooth radios, Wi-Fi radios, cellular radios, and other suitable RF radios capable of transmitting wireless communication signals. The RF signal 408 may provide notifications about the inputs 401 and 402 and/or a status of the input device 450.

The processing system 456 is configured to process the inputs 401 and 402 received via the actuators 452 and biometric sensor 454, respectively. In some embodiments, the processing system 456 may be implemented as a set of firmware and/or software modules. Example modules may include hardware operation modules for operating hardware such as the actuators 452, biometric sensor 454 and RF transmitter 458, and data processing modules for processing data associated with the selection input 401 and biometric input 402. In some embodiments, the processing system 456 may include an authentication application 457 to authenticate and/or enable a user to access one or more functions or features of the input device 450. For example, the authentication application 457 may be configured to operate the actuators 452 and biometric sensor 454; enroll the biometric signature of a user; authenticate a user based on the his or her biometric signature; and change an operation mode of the input device 450, such as between an authentication mode and an enrollment mode.

In some embodiments, the authentication application 457 may further control the transmission of the RF signal 408 by the RF transmitter 458 based, at least in part, on the inputs 401 and/or 402. For example, the authentication application 457 may control the RF transmitter 458 to transmit a first coded signal to acknowledge a selection input 401 and/or successful authentication attempt and to transmit a second coded signal to indicate an error and/or unsuccessful authentication attempt. In some aspects, the authentication application 457 may further control the RF transmitter 458 to transmit a unique codeword corresponding to a rich UI to be displayed on the display device 440. For example, the authentication application 457 may modulate the amplitude, frequency, and/or phase of the RF signal 408 for each UI-specific codeword. In some embodiments, the input device 450 may include an RF notification store 455 to store each of the codewords that can be output by the RF transmitter 458. For example, while operating in the enrollment mode, the authentication application 457 may retrieve a different codeword from the RF notification store 455 at each step of the enrollment process.

The display device 460 includes one or more actuators 462, a display 464, a processing system 466, and an RF receiver 468. The actuators 462 and display 464 may be example embodiments of the actuators 422 and display 424, respectively, of FIG. 4A. Thus, the actuators 462 are configured to receive user inputs 403 and the display 464 is configured to provide a rich UI on the display device 460. The RF receiver 468 is configured to detect the RF signals 408 transmitted by the input device 450. Example RF receivers may include, but are not limited to, NFC radios, Bluetooth radios, Wi-Fi radios, cellular radios, and other suitable RF radios capable of receiving wireless communication signals.

The processing system 466 is configured to process the RF codewords detected by the RF receiver 468. In some embodiments, the processing system 466 may be implemented as a set of firmware and/or software modules. Example modules may include hardware operation modules for operating hardware such as the actuators 462, display 464, and RF receiver 468, and data processing modules for processing data associated with the detected codewords. In some embodiments, the processing system 466 may include a user interface (UI) application 467 to enable or otherwise facilitate user interactions with the display device 460. For example, the UI application 467 may be configured to operate the actuators 462, display 464, and RF receiver 468; render media content on the display 464; and respond to user input 403 by triggering one or more actions. Example actions include changing an operation mode of the display device 460 and/or GUI actions such as cursor movement, selection, menu navigation, and the like.

In some embodiments, the UI application 467 may generate and/or update a rich UI on the display 464 to further facilitate user interactions with the input device 450. In some aspects, the UI application 467 may select media content to be rendered on the display 464 based, at least in part, on the user inputs 403 received via the actuators 462. For example, in response to the user input 403, the UI application 467 may display a combination of selection inputs 401 for placing the input device 450 in an enrollment mode. In some other aspects, the UI application 467 may select the media content to be rendered on the display 464 based, at least in part, on the RF signals 408 transmitted by the input device 450. For example, the UI application 467 may match the detected codeword to a particular content item that can be rendered on the display 464. In some embodiments, the display device 460 may include an RF notification LUT 465 that can be used to match the detected codeword to a corresponding content item. For example, each entry in the LUT 465 may correspond to a respective notification (e.g., codeword) stored in the RF notification store 455.

Figure 5:
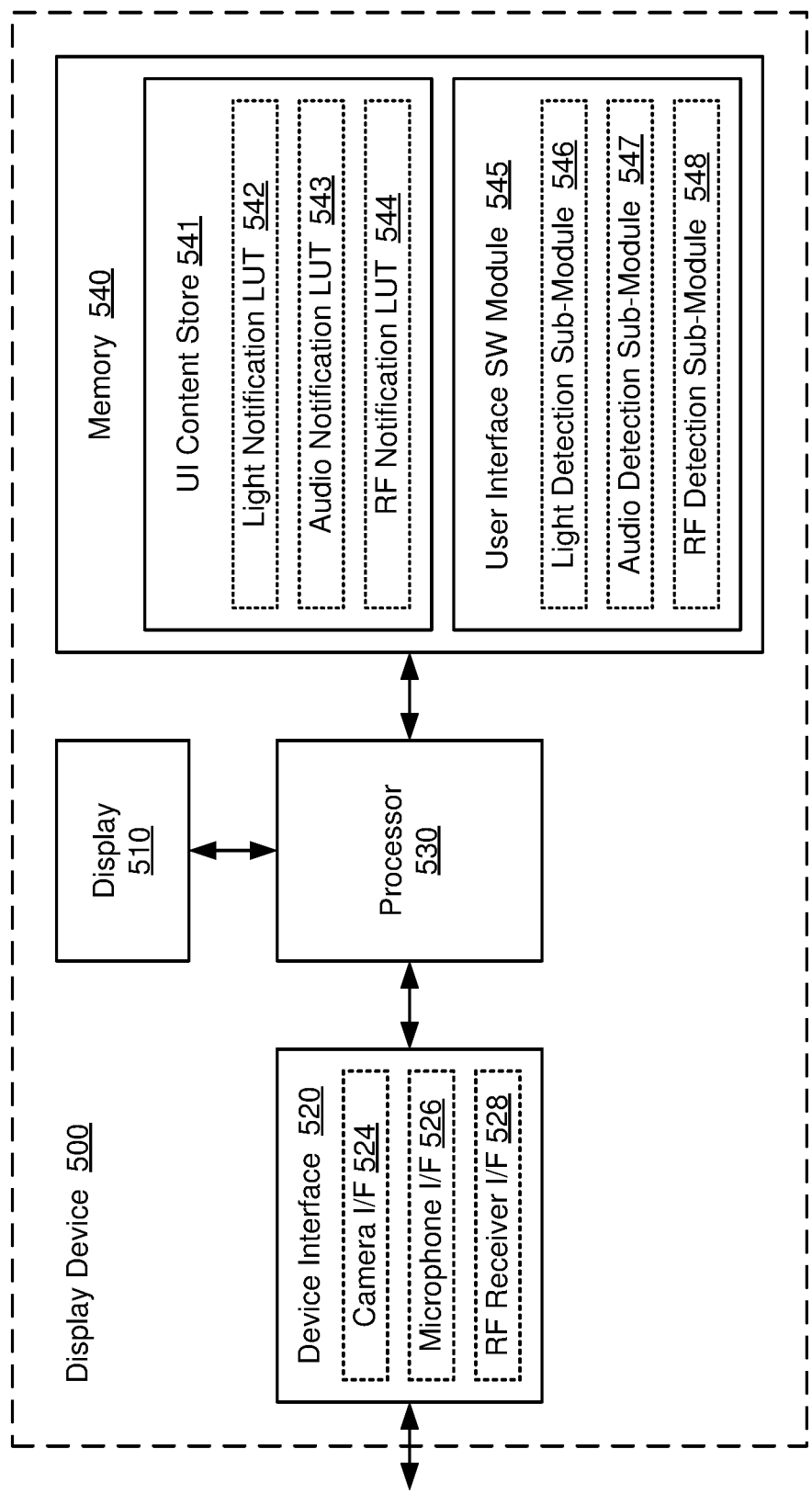
FIG. 5 is a block diagram of a display device that can be used in an input processing system, in accordance with some embodiments.

FIG. 5 is a block diagram of a display device 500 that can be used in an input processing system, in accordance with some embodiments. The display device 500 may be an example embodiment of the display device 120 of FIG. 1 and/or any of the display device 420, 440, or 460 of FIGS. 4A-4C. In some embodiments, the display device 500 may be configured to provide an on-demand display for a display-less input device.

The display device 500 includes a display 510, a device interface 520, a processor 530, and a memory 540. The display 510 may be any type of electronic display capable of displaying a rich UI. Example suitable display technologies may include, but are not limited to, LED, OLED, CRT, LCD, plasma, and EL. In some aspects, the display 510 may be integrated as a physical part of the display device 500. In some other aspects, the display 510 may be physically separated from the display device 500. For example, the display 510 may be coupled to (and communicate with) the display device 500 using various wired and/or wireless interconnection and communication technologies.

The device interface 520 may include a camera interface 524, a microphone interface 526, and an RF receiver interface 528. The camera interface 524 may be used to communicate with a camera of the display device 500 (such as the camera 428 of FIG. 4A). For example, the camera interface 524 may transmit signals to, and receive signals from, the camera to capture light-based notifications (e.g., light output 404) from the input device. The microphone interface 526 may be used to communicate with a microphone of the display device 500 (such as the microphone 448 of FIG. 4B). For example, the microphone interface 526 may transmit signals to, and receive signals from, the microphone to acquire audio-based notifications (e.g., audio output 406) from the input device. The RF receiver interface 528 may be used to communicate with an RF receiver of the display device (such as the RF receiver 468 of FIG. 4C). For example, the RF receiver interface 528 may transmit signals to, and receive signals from, the RF receiver to detect RF-based notifications (e.g., RF signal 408) from the input device.

The memory 540 includes a UI content store 541 configured to store media content (e.g., images, videos, text, and the like) that can be rendered on the display 510. In some embodiments, the UI content store 541 may store one or more content items associated with notifications detected from the input device (e.g., via the device interface 520). In some aspects, the one or more content items may include instructions for providing user input on, or otherwise interacting with, the input device. For example, the UI content store 541 may include a light notification LUT 542, an audio notification LUT 543, and/or an RF notification LUT 544.

The light notification LUT 542 may be an example embodiment of the light notification LUT 425 of FIG. 4A. For example, the light notification LUT 542 may be used to match light patterns detected via the camera interface 524 to UI-specific content items stored in the UI content store 541. The audio notification LUT 543 may be an example embodiment of the audio notification LUT 445 of FIG. 4B. For example, the audio notification LUT 543 may be used to match audio patterns detected via the microphone interface 526 to UI-specific content items stored in the UI content store 541. The RF notification LUT 544 may be an example embodiment of the RF notification LUT 465 of FIG. 4C. For example, the RF notification LUT 465 may be used to match RF codewords detected via the RF receiver interface 528 to UI-specific content items stored in the UI content store 541.

The memory 540 may also include a non-transitory computer-readable medium (e.g., one or more nonvolatile memory elements, such as EPROM, EEPROM, Flash memory, a hard drive, etc.) that may store at least the following software (SW) modules:

- a user interface SW module 545 to generate and/or update a rich UI on the display 510, the user interface SW module 545 further including:
    - a light detection sub-module 546 to detect light-based notifications output by the input device and render, on the display 510, a content item associated with the detect light pattern;

an audio detection sub-module 547 to detect audio-based notifications output by the input device and render, on the display 510, a content item associated with the detect audio pattern; and an RF detection sub-module 548 to detect RF-based notifications transmitted by the input device and render, on the display 510, a content item associated with the detect RF codeword.

Each software module includes instructions that, when executed by the processor 530, cause the display device 500 to perform the corresponding functions. The non-transitory computer-readable medium of memory 540 thus includes instructions for performing all or a portion of the operations described below.

The processor 530 may be any suitable one or more processors capable of executing scripts or instructions of one or more software programs stored in the display device 500 (e.g., within memory 540). For example, the processor 530 may execute the user interface SW module 545 to generate and/or update a rich UI on the display 510. In executing the user interface SW module 545, the processor 530 may further execute the light detection sub-module 546, the audio detection sub-module 547, and/or the RF detection sub-module 548.

For example, the processor 530 may execute the light detection sub-module 546 to detect light-based notifications output by the input device and render, on the display 510, a content item associated with the detect light pattern. Further, the processor 530 may execute the audio detection sub-module 547 to detect audio-based notifications output by the input device and render, on the display 510, a content item associated with the detect audio pattern. Still further, the processor 530 may execute the RF detection sub-module 548 to detect RF-based notifications transmitted by the input device and render, on the display 510, a content item associated with the detect RF codeword.

Figure 6:
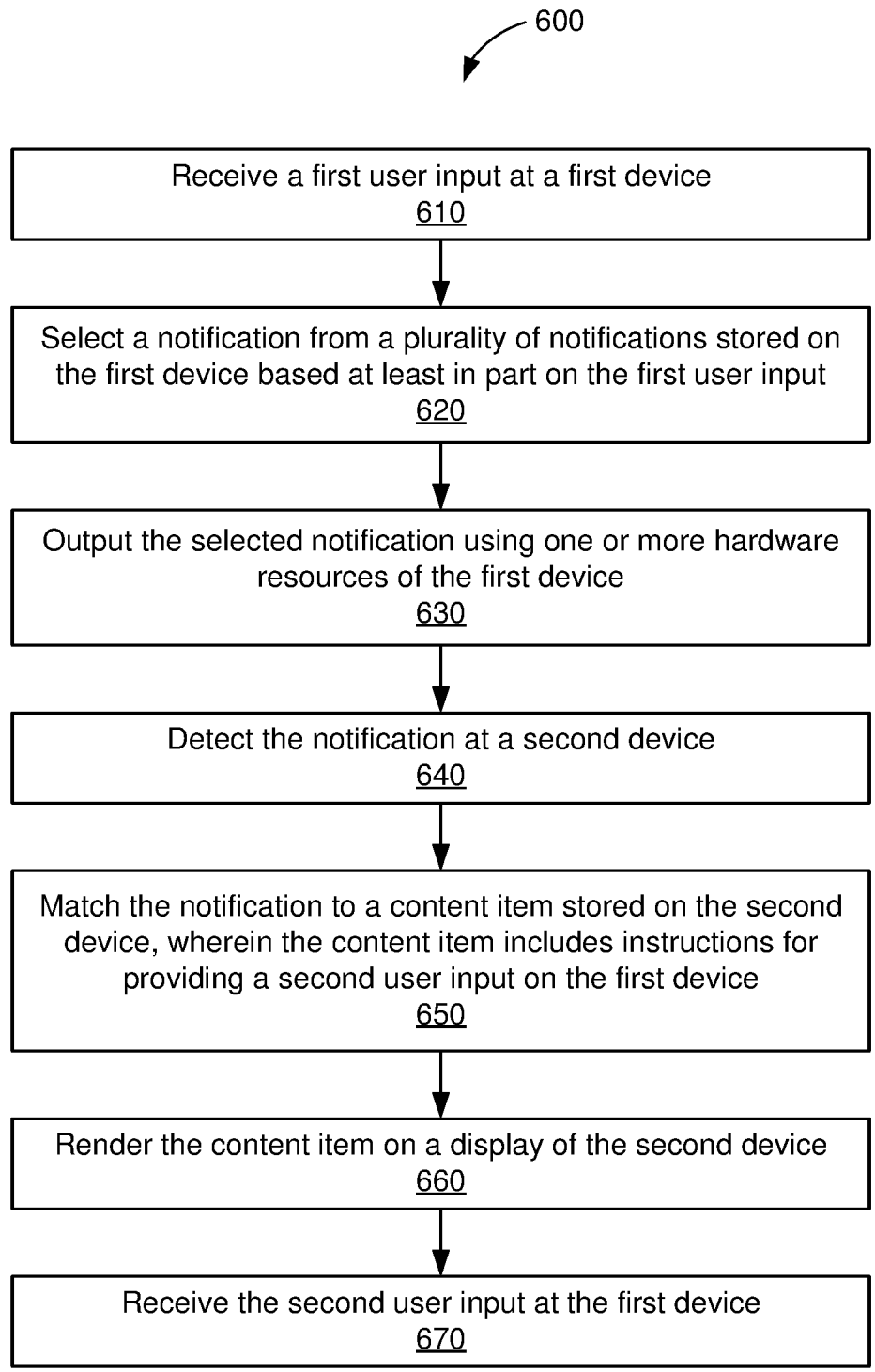
FIG. 6 is an illustrative flowchart depicting an example operation for processing user inputs, in accordance with some embodiments.

FIG. 6 is an illustrative flowchart depicting an example operation 600 for processing user inputs, in accordance with some embodiments. With reference for example to FIG. 1, the operation 600 may be performed by an input processing system 100 that includes an input device 110 and a display device 120. In some embodiments, the example operation 600 may be used to provide an on-demand rich UI for a display-less input device.

The system 100 receives a first user input at a first device (610). For example, the first user input may be provided using one or more input sources 112 of the input device 110. In some embodiments, the input sources 112 may include electrical or mechanical actuators (e.g., buttons, switches, toggles, capacitive sensors, and the like). For example, the actuators may be used to provide data and/or selection inputs to the input device 110. In some other embodiments, the input sources 112 may include device sensors (e.g., accelerometers, gyroscopes, magnetometers, photosensors, temperature sensors, pressure transducers, and the like). Still further, in some embodiments, the input sources 112 may include biometric sensors (e.g., cameras, microphones, fingerprint scanners, and the like). For example, the biometric sensors may be used to provide biometric inputs to the input device (e.g., for authentication purposes).

The system 100 selects a notification from a plurality of notifications stored on the first device based at least in part on the first user input (620). In some embodiments, the notifications may be used to guide a user to provide additional user inputs and/or perform complex tasks on the input device 110. More specifically, at least some of the notifications stored on the input device 110 may correspond to rich media content that can be rendered or displayed on the display device 120. For example, the rich media content may include images, videos, and/or text that provides a visual guide or detailed instructions for providing a subsequent user input, or otherwise interacting with, the input device 110.

The system 100 then outputs the selected notification using one or more hardware resources of the first device (630). In some embodiments, the selected notification may be output using existing notification hardware 114 of the input device 110. For example, the notification hardware 114 may include one or more light sources, speakers, or RF transmitters that can be used to output, or otherwise communicate, the UI-specific notification information. In some aspects, the notification may be output as a unique pattern of lights (e.g., as described with respect to FIG. 4A). In some other aspects, the notification may be output as a unique pattern of sounds (e.g., as described with respect to FIG. 4B). Still further, in some aspects, the notification may be output as a unique RF codeword (e.g., as described with respect to FIG. 4C).

The system 100 detects the notification at a second device (640). In some embodiments, the notification may be detected using existing detection hardware 124 of the display device 120. For example, if the notification comprises a pattern of lights, the display device 120 may detect the notification using one or more cameras or photosensors (e.g., as described with respect to FIG. 4A). On the other hand, if the notification comprises a pattern of sounds, the display device 120 may detect the notification using one or more microphones (e.g., as described with respect to FIG. 4B). Still further, if the notification comprises one or more RF signals, the display device 120 may detect the notification 102 using one or more RF receivers (e.g., as described with respect to FIG. 4C).

The system 100 further matches the notification to a content item stored on the second device (650). More specifically, the display device 120 may be configured to interpret and/or process the UI-specific notifications output by the input device 110. In some aspects, the display device 120 may select the appropriate content to be rendered on its display 122 based, at least in part, on the detected notification. For example, the display device 120 may use a LUT to match the detected notification to a particular content item (e.g., image, video, or other media content) stored on, or otherwise accessible by, the display device 120. In some embodiments, the content item may include instructions for providing a second (e.g., subsequent) user input on the input device 110.

The system 100 then renders the content item on a display of the second device (660). In some embodiments, the display device 120 may generate and/or update a rich UI rendered on its display 122. As described above, the rich UI may include images, videos, and/or text corresponding to a visual guide or detailed instructions for providing a subsequent user input, or otherwise interacting with, the input device 110. For example, the rich UI may display a step-by-step guide for initiating and/or completing a biometric enrollment process (e.g., as described with respect to FIG. 3).

The system 100 may further receive the second user input at the first device (670). For example, the second user input may be provided using the one or more input sources 112 of the input device 110 (e.g., according to the instructions displayed on the display device). In some embodiments, the second user input may include a data and/or selection input provided using electrical and/or mechanical actuators of the input device 110. In some other embodiments, the second user input may include a biometric input provided using a biometric sensor of the input device 110. It is noted, however, that the input device 110 may not depend on any interaction with the display device 120 to receive any of the user inputs (e.g., as described with respect to FIG. 2).

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, embodiments have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A system, comprising:
a display-less first device including at least one or more notification hardware resources and one or more input sources, the display-less first device configured to:
receive a first user input directly on the first device via the one or more input sources of the first device;
select a first notification from a plurality of notifications stored on the first device based at least in part on receiving the first user input directly on the first device;
output the selected first notification as a unique pattern of lights using the one or more notification hardware resources of the first device; and
receive a second user input subsequent to the first user input, the second user input received directly on the first device via the one or more input sources; and a second device including at least a camera, a user interface, and an electronic display, the second device configured to:
capture, via the camera of the second device, the unique pattern of lights output by the first device;
match the unique pattern of lights to a first content item of a plurality of content items stored on the second device for display on the user interface of the second device based on a mapping of the unique pattern of lights to the first content item, wherein each content item of the plurality of content items is configured to be displayed on the second device responsive to a respective notification of the plurality of notifications stored on the first device, wherein the first content item and the mapping are stored on the second device, and wherein the first content item includes instructions for inputting the second user input directly on the first device; and
render the user interface, including the first content item matching the unique pattern of lights, on the electronic display of the second device.

2. The system of claim 1, wherein the second device is further configured to:
select the first content item from the plurality of content items stored on the second device, wherein each content item of the content items stored on the second device corresponds to a respective one of the notifications stored on the first device, wherein the second device matches the unique pattern of lights to one of the plurality of content items using a light notification lookup table (LUT).

3. The system of claim 1, wherein the first device is further configured to:
select a second notification from the plurality of notifications based at least in part on the second user input, wherein the second device includes a light notification store for storing each of the plurality of notifications; and
output the second notification using the one or more notification hardware resources.

4. The system of claim 1, wherein the one or more input sources of the first device include one or more actuators to receive the first user input, the first device being further configured to:
enter an enrollment mode in response to the first user input, wherein the first notification is selected based on the first device switching from an authentication mode to the enrollment mode, wherein the first content item includes instructions for enrolling a biometric profile on the first device, wherein the enrollment mode includes a plurality of steps, and wherein a different unique pattern of lights is retrieved from a light notification store of the first device at each step of the plurality of steps.

5. The system of claim 4, wherein the one or more input sources of the first device further include a biometric sensor to receive the second user input, the first device being further configured to:
generate or update the biometric profile based at least in part on the second user input; and
revert to the authentication mode upon completing the enrollment of the biometric profile.

6. The system of claim 5, wherein the first device is further configured to:
receive a third user input via the biometric sensor; and authenticate a user of the first device based at least in part on a comparison of the third user input and the biometric profile.

7. The system of claim 6, wherein the first device is further configured to:
enable access to one or more functions of the first device in response to authenticating the user.

8. The system of claim 1, wherein the one or more notification hardware resources of the first device includes one or more light sources to output the first notification as the unique pattern of lights, and wherein the second device includes the camera to capture the unique pattern of lights output by the first device.

9. The system of claim 1, wherein the one or more notification hardware resources of the first device includes one or more audio output components to output a notification as a pattern of sounds, and wherein the second device includes a microphone to capture the pattern of sounds output by the first device.

10. The system of claim 1, wherein the one or more notification hardware resources of the first device includes one or more radio-frequency (RF) transmitters to output a notification as an RF signal, and wherein the second device includes an RF receiver to receive the RF signal output by the first device.

11. A method of processing user inputs, comprising:
receiving a first user input directly on a display-less first device via one or more input sources of the first device;
selecting a first notification from a plurality of notifications stored on the first device based at least in part on receiving the first user input directly on the first device;
outputting the selected first notification as a unique pattern of lights using one or more notification hardware resources of the first device;
capture, at a second device via a camera of the second device, the unique pattern of lights output by the first device;
matching the unique pattern of lights to a first content item of a plurality of content items stored on the second device for display on the user interface of the second device based on a mapping of the unique pattern of lights to the first content item, wherein each content item of the plurality of content items is configured to be displayed on the second device responsive to a respective notification of the plurality of notifications stored on the first device, wherein the first content item and the mapping are stored on the second device, and wherein the first content item includes instructions for inputting a second user input directly on the first device;
rendering the user interface, including the first content item matching the unique pattern of lights, on an electronic display of the second device; and
receiving the second user input at the first device subsequent to the first user input, the second user input received directly on the first device via the one or more input sources.

12. The method of claim 11, wherein the matching comprises:
selecting the first content item from the plurality of content items stored on the second device, wherein each content item of the content items stored on the second device corresponds to a respective one of the notifications stored on the first device, wherein the second device matches the unique pattern of lights to a corresponding one of the plurality of content items using a light notification lookup table (LUT).

13. The method of claim 11, further comprising:
Selecting a second notification from the plurality of notifications stored on the first device based at least in part on the second user input, wherein the second device includes a light notification store for storing each of the plurality of notifications; and
outputting the second notification using the one or more notification hardware resources of the first device.

14. The method of claim 11, wherein the first user input is received via one or more actuators of the first device, the method further comprising:
entering an enrollment mode in response to the first user input, wherein the first notification is selected based on the first device switching from an authentication mode to the enrollment mode, wherein the first content item includes instructions for enrolling a biometric profile on the first device, wherein the enrollment mode includes a plurality of steps, and wherein a different unique pattern of lights is retrieved from a light notification store of the first device at each step of the plurality of steps.

15. The method of claim 14, wherein the first user input is received via a biometric sensor of the first device, the method further comprising:
generating or updating the biometric profile on the first device based at least in part on the second user input; and
reverting to the authentication mode upon completing the enrollment of the biometric profile.

16. The method of claim 15, further comprising:
receiving a third user input via the biometric sensor of the first device;
authenticating a user of the first device based at least in part on a comparison of the third user input and the biometric profile; and
enabling access to one or more functions of the first device in response to authenticating the user.

17. A display device, comprising:
an electronic display;
a camera;
one or more processors; and
a memory storing instructions that, when executed by the one or more processors, cause the display device to:
capture, via the camera, a unique pattern of lights corresponding to a notification, output by a display-less input device, wherein the notification is selected by the input device from a plurality of notifications stored on the input device based at least in part on receiving a first user input directly on the input device via one or more input sources of the input device;
match the unique pattern of lights to a content item of a plurality of content items stored on the display device for display on a user interface of the display device based on a mapping of the unique pattern of lights to the content item, each of the plurality of content items configured to be displayed on the display device responsive to a respective notification of the plurality of notifications stored on the input device, the content item and the mapping stored on the display device, and the content item including instructions for inputting a second user input directly on the input device; and
render the user interface, including the content item matching the unique pattern of lights, on the electronic display.

18. The display device of claim 17, wherein a notification is output by the input device as a pattern of sounds, and wherein the display device further includes a microphone to capture the pattern of sounds output by the input device.

19. The display device of claim 17, wherein a notification is output by the input device as a radio-frequency (RF) signal, and wherein the display device further includes an RF receiver to receive the RF signal output by the input device.

\* \* \* \* \*